US008640150B2

(12) United States Patent
Shiono

(10) Patent No.: US 8,640,150 B2
(45) Date of Patent: Jan. 28, 2014

(54) INFORMATION PROCESSING TERMINAL, INFORMATION PROCESSING METHOD, AND PROGRAM PRODUCT

(75) Inventor: Kouichi Shiono, Kawasaki (JP)

(73) Assignee: Ricoh Company, Limited, Tokyo (JP)

( * ) Notice: Subject to any disclaimer, the term of this patent is extended or adjusted under 35 U.S.C. 154(b) by 1335 days.

(21) Appl. No.: 12/182,482

(22) Filed: Jul. 30, 2008

(65) Prior Publication Data

US 2009/0037930 A1 Feb. 5, 2009

(30) Foreign Application Priority Data

Jul. 31, 2007 (JP) ................. 2007-199952

(51) Int. Cl.
G06F 3/00 (2006.01)
G06F 9/44 (2006.01)
G06F 9/46 (2006.01)
G06F 13/00 (2006.01)
G06F 9/445 (2006.01)

(52) U.S. Cl.
USPC ........... 719/331; 719/313; 719/320; 717/168; 717/174

(58) Field of Classification Search
None
See application file for complete search history.

(56) References Cited

U.S. PATENT DOCUMENTS

| 5,404,520 | A  | * | 4/1995 | Sonobe ................. 718/101 |
| 6,401,198 | B1 | * | 6/2002 | Harmer et al. ........... 713/1 |
| 6,480,599 | B1 | * | 11/2002 | Ainslie et al. ........... 379/265.02 |
| 2001/0005899 | A1 | * | 6/2001 | Tanaka ................. 717/11 |
| 2003/0101092 | A1 | * | 5/2003 | Fuller et al. ............ 705/14 |
| 2006/0155779 | A1 | * | 7/2006 | Kim et al. .............. 707/201 |
| 2006/0208083 | A1 | * | 9/2006 | Kotlarsky et al. ........ 235/462.01 |
| 2006/0218499 | A1 | * | 9/2006 | Matthews et al. ......... 715/765 |
| 2007/0038642 | A1 | * | 2/2007 | Durgin et al. ........... 707/10 |
| 2007/0156913 | A1 | * | 7/2007 | Miyamoto et al. ........ 709/230 |

FOREIGN PATENT DOCUMENTS

| JP | 2006-85291 | 3/2006 |
| JP | 2006-85529 | 3/2006 |
| JP | 2006-261970 | 9/2006 |

* cited by examiner

*Primary Examiner* — H S Sough
*Assistant Examiner* — Craig Dorais
(74) *Attorney, Agent, or Firm* — Oblon, Spivak, McClelland, Maier & Neustadt, L.L.P.

(57) ABSTRACT

An information processing terminal enables, during the execution of a predetermined application program, the addition of an additional program and the execution of the additional program in a predetermined memory. The information processing terminal includes a management device, an acquisition device, an execution device, and a deletion device. The management device manages the additional program and a plug-in point included in the application program by associating the additional program with the plug-in point. The acquisition device acquires, upon execution of the application program up to the plug-in point, the additional program associated with the plug-in point from a predetermined storage device. The execution device executes the acquired additional program in the memory. The deletion device deletes, upon completion of the execution of the additional program, the additional program from the memory.

15 Claims, 8 Drawing Sheets

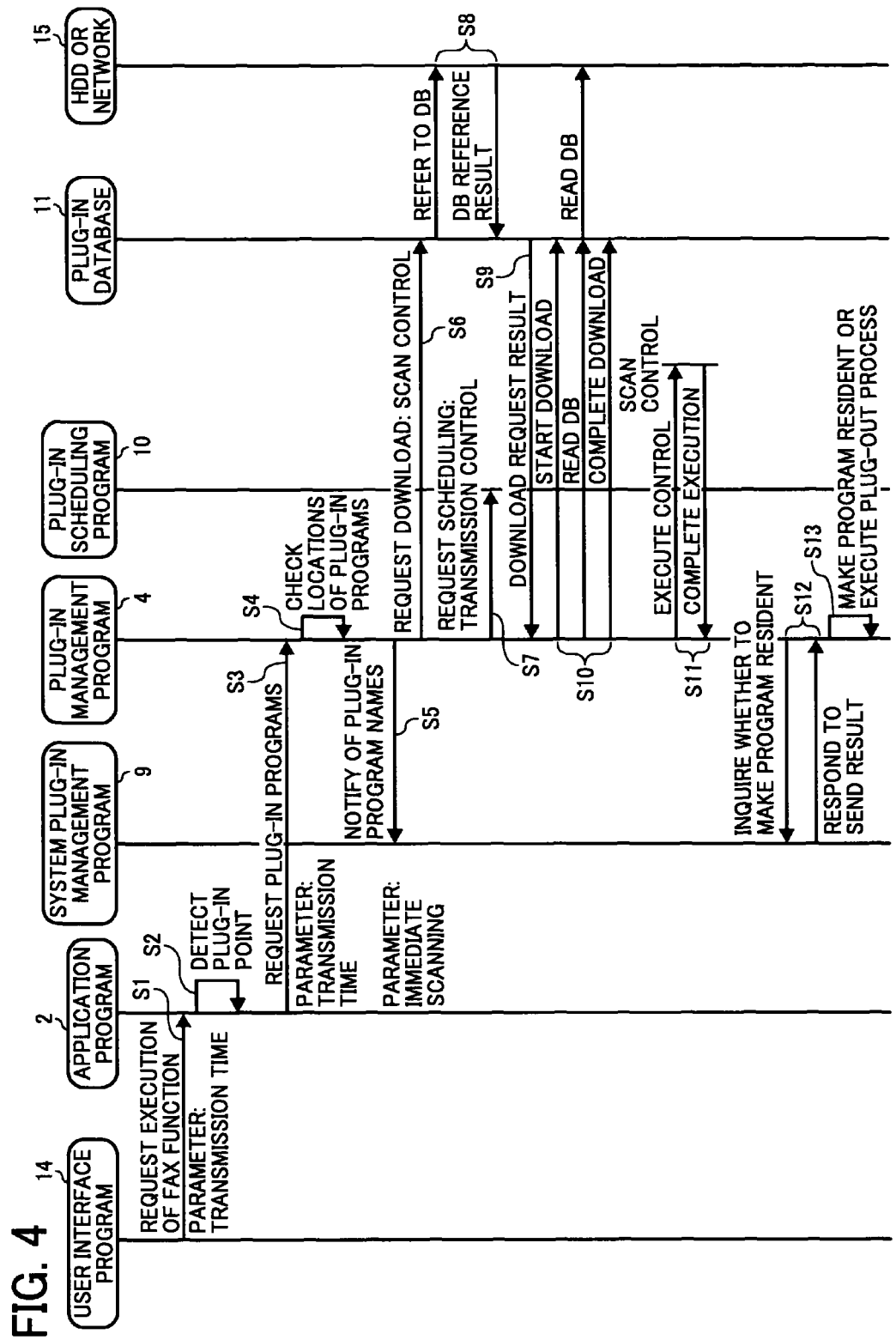

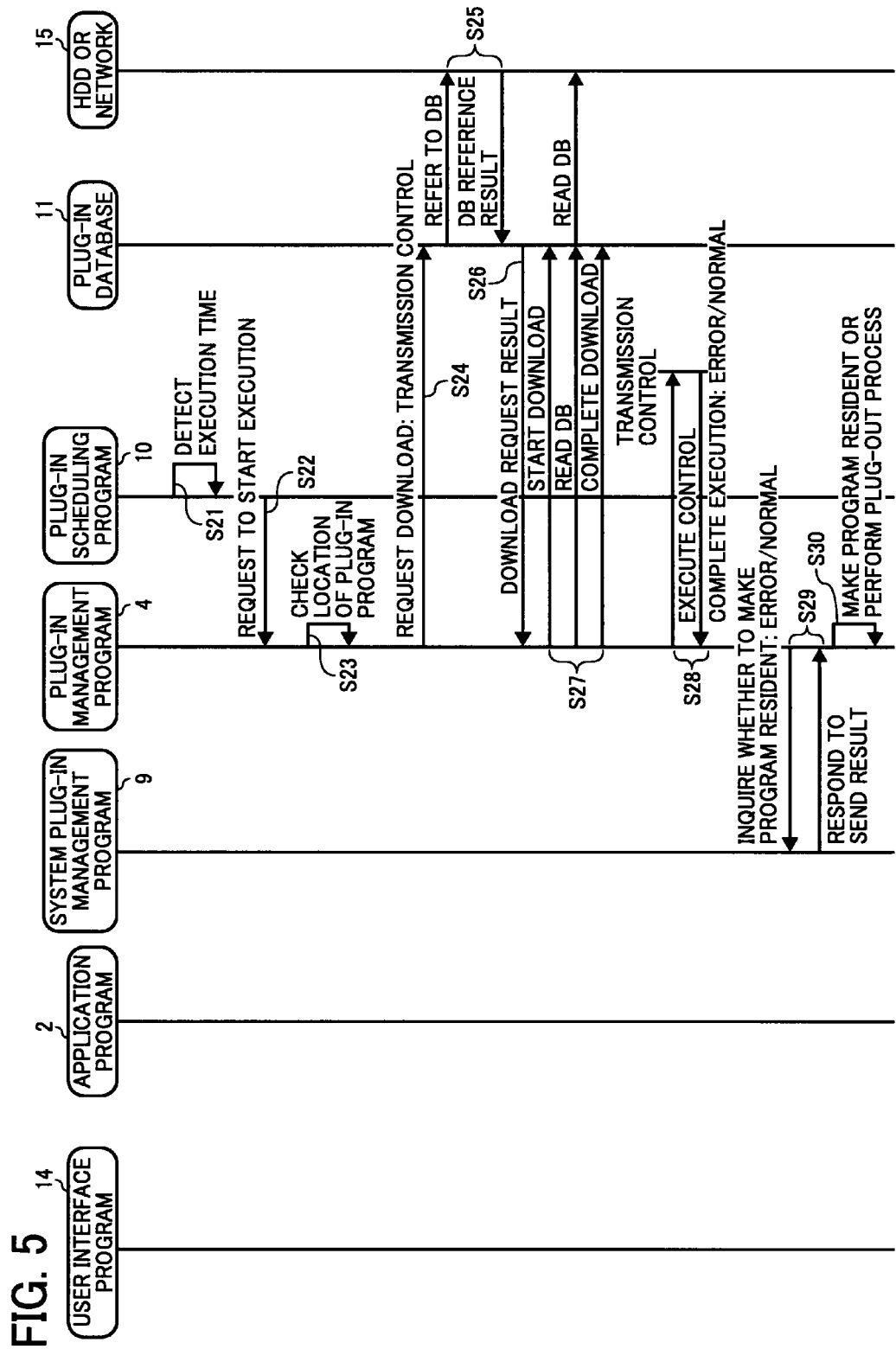

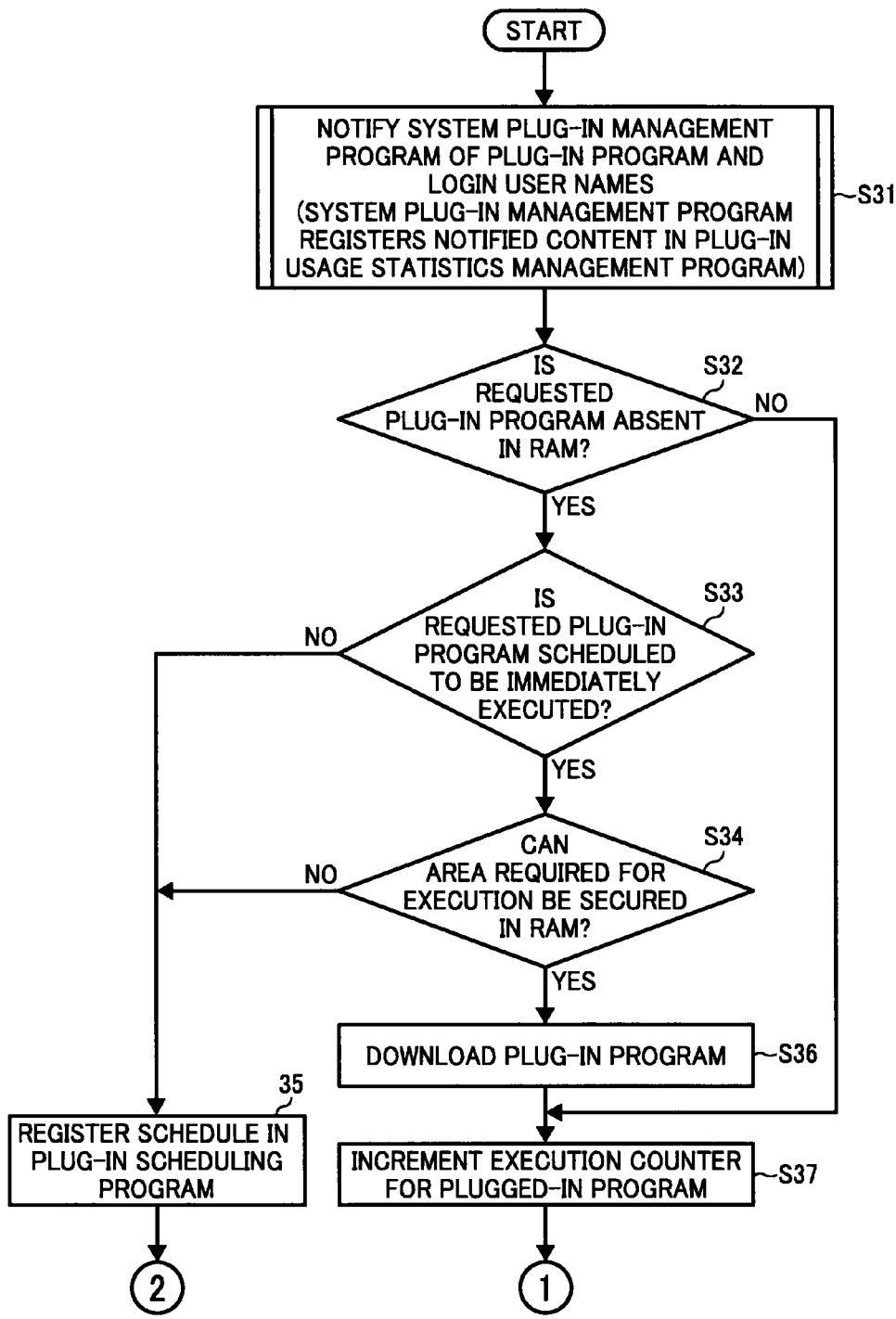

INFORMATION PROCESSING TERMINAL, INFORMATION PROCESSING METHOD, AND PROGRAM PRODUCT

CROSS-REFERENCE TO RELATED APPLICATION

This application claims priority to Japanese Patent Application No. 2007-199952 filed on Jul. 31, 2007, the entire contents of which are hereby incorporated by reference herein.

BACKGROUND OF THE INVENTION

1. Field of the Invention

The present invention relates to an information processing terminal, an information processing method, and a program product enabling, during the execution of a predetermined program, the addition and execution of another program stored in a server or a local memory as a plug-in program.

2. Discussion of the Background Art

A multifunctional machine, which is an example of an information processing terminal, includes a program for controlling the hardware thereof. Thus, the multifunctional machine is required to perform in real time. Such real-time performance is also required in a user interface and so forth. Therefore, programs are made resident and executed in a memory such as a RAM (Random Access Memory), for example.

However, as the functions of the multifunctional machine become more complicated and diverse, the number of programs made resident in the RAM is increased, and the program capacity of the RAM is accordingly increased. As a result, the size of the RAM is increased, which increases the costs of the product.

To address the above issue, such techniques as a shared library method and a dynamic link library method have been used to execute common processes, thereby saving RAM capacity.

Further, according to another background technique, a program not required to have the real-time performance is stored in an HDD (Hard Disk Drive) as a separate process. Then, when required, the program is loaded into the RAM using SWAP (Shared Wireless Access Protocol) or the paging function of an OS (Operating System). Meanwhile, a program required to have the real-time performance is not subjected to the SWAP and the paging function. The above technique provides a mechanism for effective parallel processing, but not a fundamental solution for preventing an unnecessary program from being loaded into the memory.

Recent market demand tends toward customization of the multifunctional machine. With the spread of the Java (registered trademark) programming language, a variety of programs can now be treated as components without reliance on the OS and the CPU (Central Processing Unit). For example, a JVM (Java Virtual Machine) program is executed as one process. Thus, a part of the program requiring the real-time performance is implemented as a native process not subjected to the customization. However, most parts of the program do not require the real-time performance. Thus, the program is implemented as a Java program. Java also provides a platform on which the plug-in process can be performed.

Background techniques relating to an apparatus using the plug-in system include the following examples. In an image forming system according to a first background technique, if the hardware of a multifunctional machine is replaced with another piece of hardware, the multifunctional machine acquires the information for the newly replaced hardware and a list of plug-in information for plug-in programs currently present in the multifunctional machine. Thereafter, the multifunctional machine transmits the plug-in information and hardware information to a server. Then, the server determines whether or not each of the plug-in programs currently present in the multifunctional machine is suitable for the new hardware, and notifies the multifunctional machine of the applicability or non-applicability of the plug-in program. Upon receipt of such notification, the multifunctional machine updates the plug-in information list.

According to a second background technique, an image processing apparatus includes an application program including an extension point representing a function extensible portion, and a plug-in module associated with the extension point. Upon execution of the application program up to the extension point, an application control unit executes the plug-in module associated with the extension point by a plug-in control unit.

In an information processing apparatus according to a third background technique, upon activation of an application program, a control device reads processing order information relating to the processing order for each of a plurality of program modules stored in a storage device. Then, the control device determines the processing order of the plurality of program modules in accordance with the processing order information.

The background techniques described above all relate to the apparatus, such as the multifunctional machine, using the plug-in system. The background examples mention the function extensibility and the authentication and compatibility of a program in the extension process, but are not intended to address the above-described issue of loading of an unnecessary program into a memory.

SUMMARY OF THE INVENTION

This patent specification describes an information processing terminal. In one example, an information processing terminal enables, during the execution of a predetermined application program, the addition of an additional program and the execution of the additional program in a predetermined memory. The information processing terminal includes a management device, an acquisition device, an execution device, and a deletion device. The management device manages the additional program and a plug-in point included in the application program by associating the additional program with the plug-in point. The acquisition device acquires, upon execution of the application program up to the plug-in point, the additional program associated with the plug-in point from a predetermined storage device. The execution device executes the acquired additional program in the memory. The deletion device deletes, upon completion of the execution of the additional program, the additional program from the memory.

This patent specification further describes an information processing method. In one example, an information processing method enables, during the execution of a predetermined application program, the addition of an additional program and the execution of the additional program in a predetermined memory. The information processing method includes: managing the additional program and a plug-in point included in the application program by associating the additional program with the plug-in point; acquiring, upon execution of the application program up to the plug-in point, the additional program associated with the plug-in point from a predetermined storage device; executing the acquired additional program in the memory; and deleting, upon completion of the execution of the additional program, the additional program from the memory.

This patent specification further describes a program product. In one example, a program product enables, during the execution of a predetermined application program, the addition of an additional program and the execution of the additional program in a predetermined memory. The program product includes a computer usable medium having computer readable program codes embodied in the medium that, when executed, causes a computer to execute: managing the additional program and a plug-in point included in the application program by associating the additional program with the plug-in point; acquiring, upon execution of the application program up to the plug-in point, the additional program associated with the plug-in point from a predetermined storage device; executing the acquired additional program in the memory; and deleting, upon completion of the execution of the additional program, the additional program from the memory.

BRIEF DESCRIPTION OF THE DRAWINGS

A more complete appreciation of the invention and many of the advantages thereof are obtained as the same becomes better understood by reference to the following detailed description when considered in connection with the accompanying drawings, wherein:

FIG. 4 is a sequence chart illustrating operations performed in a plug-in process of a plug-in program for a scan control;

FIG. 5 is a sequence chart illustrating operations performed in a plug-in process of a plug-in program for a transmission control;

FIGS. 6A and 6B are flowcharts illustrating a control flow of a plug-in program load determination process by a plug-in management program.

DETAILED DESCRIPTION OF THE INVENTION

Figure 1:
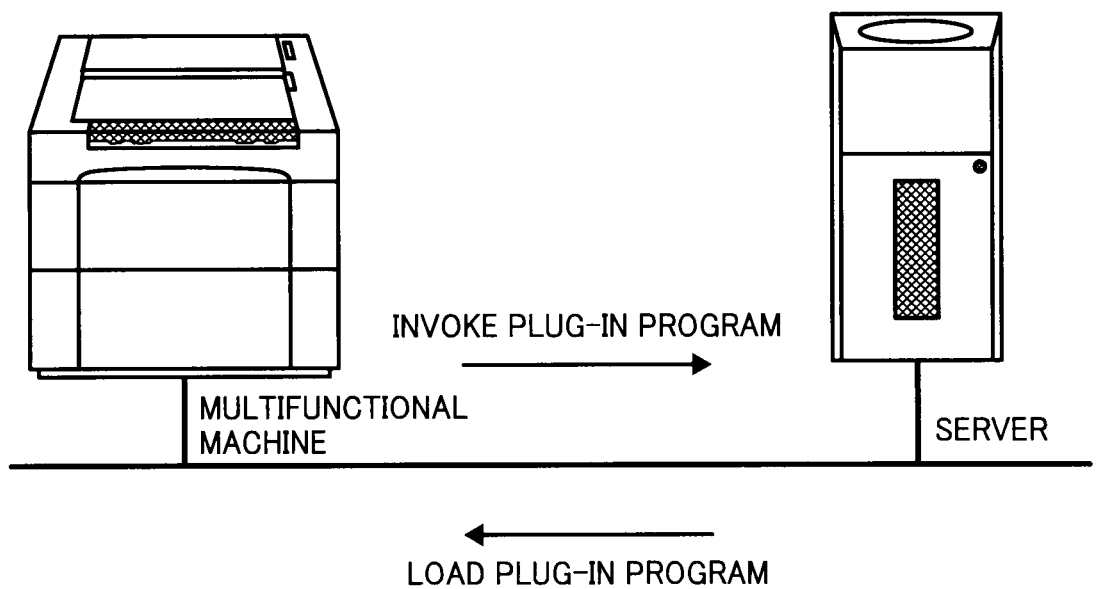
FIG. 1 is a conceptual diagram illustrating the relationship between a server and a plug-in multifunctional machine according to an embodiment of the present invention.

In describing the embodiments illustrated in the drawings, specific terminology is employed for the purpose of clarity. However, the disclosure of this patent specification is not intended to be limited to the specific terminology so used, and it is to be understood that substitutions for each specific element can include any technical equivalents that operate in a similar manner.

Referring now to the drawings, wherein like reference numerals designate identical or corresponding parts throughout the several views, particularly to FIG. 1, description will be made of an embodiment of the present invention.

FIG. 1 is a conceptual diagram of a plug-in multifunctional machine (hereinafter referred to as the multifunctional machine) according to an embodiment of the present invention. In FIG. 1, a program to be plugged in, i.e., an additional program (hereinafter referred to as the plug-in program) is stored in a server located on a network. The server is connected via the network to the multifunctional machine which sends the server a request for plug-in. The multifunctional machine requests the server to invoke the plug-in program. Upon receipt of the request, the server loads the plug-in program into the multifunctional machine.

In the configuration illustrated in FIG. 1, the plug-in program is stored in the server. As an alternative configuration, the plug-in program may be stored in a large capacity memory provided inside the multifunctional machine, e.g., an HDD (Hard Disk Drive). In either of the configurations, the mount function of an OS (Operating System) is used. Thus, the difference between the two configurations is unnoticed by the program which requests the plug-in. Further, the following description will be made of an example in which the plug-in is requested by the multifunctional machine. Alternatively, the plug-in may be requested by an information processing terminal such as a personal computer. Further, the function of the server may be implemented by the HDD of the multifunctional machine.

Figure 2:
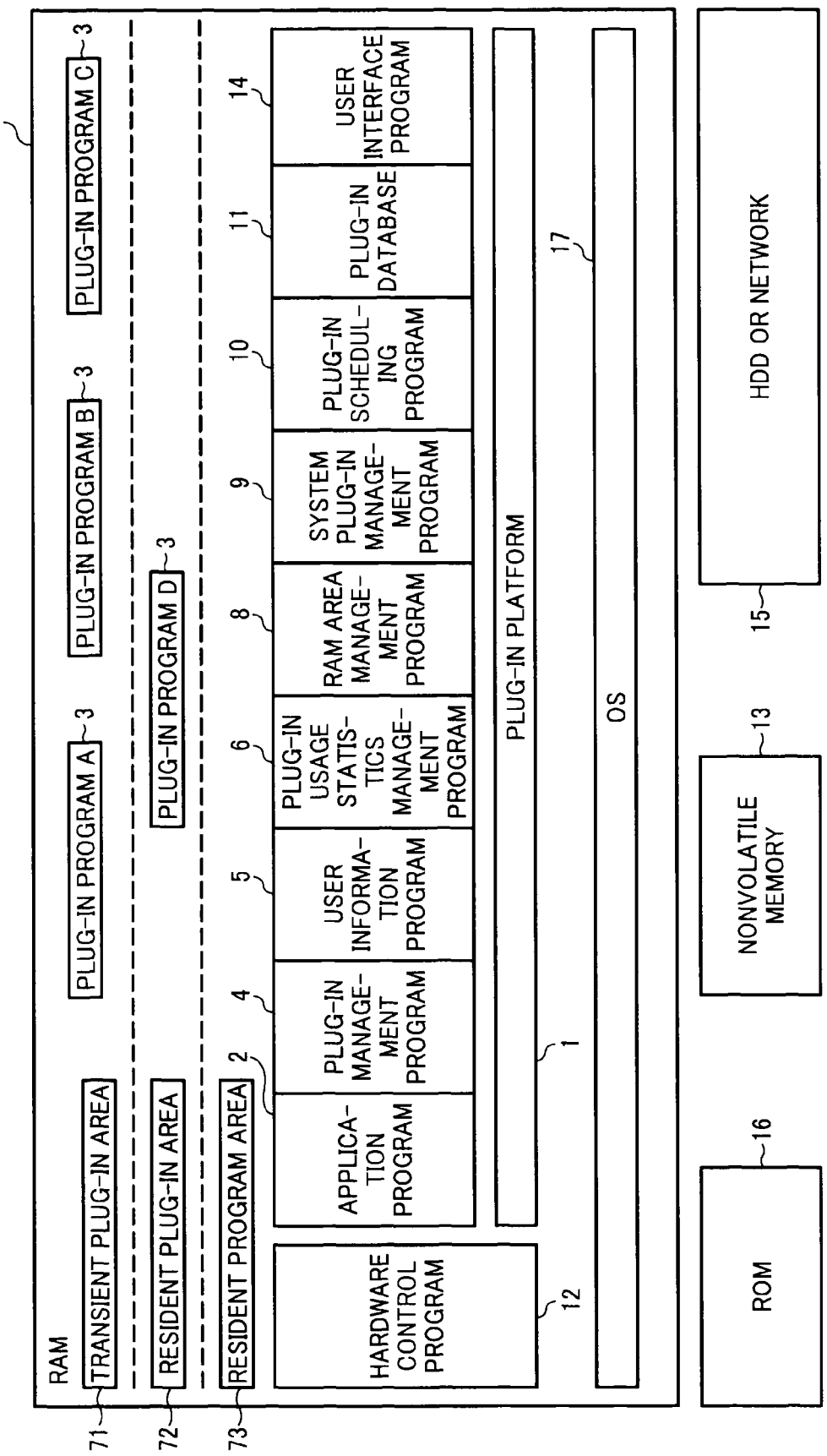
FIG. 2 is a block diagram illustrating a configuration of essential parts of the multifunctional machine illustrated in FIG. 1.

FIG. 2 is a block diagram illustrating a configuration of essential parts of the multifunctional machine illustrated in FIG. 1. With reference to FIG. 2, the respective parts of the multifunctional machine will be described.

The multifunctional machine includes a RAM 7, a ROM (Read-Only Memory) 16, and a nonvolatile memory 13. The multifunctional machine further includes an HDD. As described above, the HDD may implement the function of the server. For the sake of convenience, therefore, the HDD is herein referred to as the HDD or network 15. The RAM 7 includes three areas, i.e., a transient plug-in area 71, a resident plug-in area 72, and a resident program area 73. The transient plug-in area 71 includes plug-in programs 3, which are plug-in programs A, B, and C in this example. The resident plug-in area 72 includes another plug-in program 3, which is a plug-in program D in this example. The resident program area 73 includes a plug-in platform 1, an application program 2, a plug-in management program 4, a user information program 5, a plug-in usage statistics management program 6, a RAM area management program 8, a system plug-in management program 9, a plug-in scheduling program 10, a plug-in database 11, a hardware control program 12, and an OS 17.

The plug-in platform 1 is a platform enabling the plug-in process, such as an OSGi (Open Services Gateway Initiative) platform.

The application program 2 is a main program for implementing the respective functions of the multifunctional machine, e.g., the functions of a copier, a printer, a scanner, and a facsimile machine. The application program 2 is created to inherit the properties of the plug-in platform 1. Upon execution of the application program 2 up to a plug-in point which represents a portion of the application program 2 enabling the addition of another program, i.e., upon detection of the plug-in point, the application program 2 requests via the plug-in platform 1 the plug-in management program 4 to invoke the corresponding one of the plug-in programs 3, i.e., the additional programs described below.

The plug-in programs 3 form a group of programs for implementing main functions of the application program 2. Herein, the plug-in programs 3 include the plug-in programs A, B, C, and D, for example.

The plug-in management program 4 manages the plug-in point and the plug-in program 3 by associating the plug-in point with the plug-in program 3. The plug-in management program 4 is created to inherit the properties of the plug-in platform 1. Upon receipt of the request from the application program 2 to invoke the plug-in program 3, the plug-in management program 4 requests the plug-in database 11 to download the plug-in program 3, on the basis of a plug-in program name mapped on an invocation interface (not illustrated). The plug-in management program 4 further has a function of executing the downloaded plug-in program 3 after the download of the plug-in program 3. Furthermore, the plug-in management program 4 has a function of executing the plug-out of the plug-in program 3 after the execution of the plug-in program 3.

That is, the plug-in management program 4 manages the plug-in program 3 and the plug-in point included in the predetermined application program 2 by associating the plug-in program 3 with the plug-in point. Then, upon execution of the predetermined application program 2 up to the plug-in point, the plug-in management program 4 acquires the plug-in program 3 associated with the plug-in point from a predetermined storage device, i.e., the HDD or network 15. For example, the plug-in management program 4 acquires the plug-in program 3 from the HDD of the multifunctional machine or the server illustrated in FIG. 1. Then, the plug-in management program 4 executes the acquired plug-in program 3 in the memory such as the RAM 7. Upon completion of the execution of the plug-in program 3, the plug-in management program 4 executes the deletion, i.e., the plug-out of the plug-in program 3 from the memory.

Further, if a plurality of users simultaneously use the application program 2, and if the plug-in management program 4 receives from the application program 2 the request for the addition of the plug-in program 3, the plug-in management program 4 causes the plug-in program 3 previously loaded into the RAM 7 to be shared by the plurality of users. That is, when a plurality of users simultaneously use the same function (the same application program 2), i.e., when the same program as the already plugged-in program is to be plugged in, the plug-in management program 4 does not execute the plug-in operation for the latter program. Instead, the plug-in management program 4 causes the already plugged-in program to be shared by the plurality of users.

Further, on the basis of a condition for starting the execution of the plug-in program 3, the plug-in management program 4 executes a control to defer or suspend the acquisition of the plug-in program 3. Herein, the condition for starting the execution of the plug-in program 3 includes, for example, at least one of the time at which the execution of the plug-in program 3 is started and the area of the RAM 7 in which the plug-in program 3 can be executed. For example, if the requested plug-in program 3 is not to be immediately executed, e.g., if a predetermined execution start time has been specified, or if the requested plug-in program 3 cannot be loaded into the RAM 7 due to the lack of the RAM capacity required to execute the transient program, the addition of the plug-in program 3 is deferred. In this case, the plug-in management program 4 registers the execution start condition in the plug-in scheduling program 10. Upon detection of satisfaction of the registered execution start condition, the plug-in scheduling program 10 requests the plug-in management program 4 to start the execution of the plug-in program 3, the acquisition of which has been deferred. Upon receipt of the request, the plug-in management program 4 acquires the requested plug-in program 3.

The user information program 5 manages user information, which is the information relating to the users accessible to the multifunctional machine. In the present example, the user information program 5 tallies the usage frequency of the multifunctional machine for each of the users. That is, the user information program 5 counts the number of uses of the multifunctional machine by each of the users.

The plug-in usage statistics management program 6 is created to inherit the properties of the user information program 5. The plug-in usage statistics management program 6 is responsible for collecting usage statistics for each of the users by associating the name of the plug-in program 3, the download of which has been requested by the plug-in management program 4, with the number of invocations or the number of uses of the plug-in program 3. The information of the usage statistics is used when the system plug-in management program 9 determines the plug-in program 3 to be made resident in the RAM 7. That is, the plug-in usage statistics management program 6 counts the number of uses of the plug-in program 3. Herein, the counted number of uses of the plug-in program 3 is the number of uses of the plug-in program 3 by each of the users or the number of uses of the plug-in program 3 by all of the users, i.e., the number of uses of the plug-in program 3 in the entire multifunctional machine or the entire system.

In accordance with the intended use, the RAM 7 is divided into the three areas of the transient plug-in area 71, the resident plug-in area 72, and the resident program area 73. The transient plug-in area 71 is an area for executing transient plug-in programs. The resident plug-in area 72 is an area for executing resident plug-in programs. The resident program area 73 is an area for executing programs which need to be resident in any case, such as programs for controlling devices and the network, for example.

The RAM area management program 8 manages the three areas of the RAM 7, i.e., the transient plug-in area 71, the resident plug-in area 72, and the resident program area 73. Further, the RAM area management program 8 knows the size of the installed RAM 7 and the capacity of the RAM 7 for enabling the plug-in operation.

The system plug-in management program 9 manages the plug-in program 3 common and resident in the system. The system plug-in management program 9 determines whether or not to make the plug-in program 3 resident in the RAM 7, on the basis of the number of uses of the plug-in program 3 counted by the plug-in usage statistics management program 6, i.e., the number of uses of the plug-in program 3 by each of the users or the number of uses of the plug-in program 3 by all of the users, which corresponds to the number of uses of the plug-in program 3 in the entire multifunctional machine or the entire system. Alternatively, the system plug-in management program 9 may determine whether or not to make the plug-in program 3 resident in the RAM 7, on the basis of the number of uses of the multifunctional machine by each of the users counted by the user information program 5 and the number of uses of the plug-in program 3 by each of the users counted by the plug-in usage statistics management program 6.

Further, the system plug-in management program 9 stores the state of the RAM 7 before the power-off of the multifunctional machine, i.e., the resident state of the plug-in program 3 to restore the stored state of the RAM 7 at the next power-on of the multifunctional machine.

The plug-in scheduling program 10 executes the suspension of the plug-in program 3 when the plug-in program 3 cannot be immediately plugged in due to the lack of free space in the RAM 7. When the application program 2 invokes the plug-in management program 4, the execution time of the plug-in program 3 can be specified on the interface (not illustrated). In this case, too, the plug-in scheduling program 10 executes the suspension of the plug-in program 3. Further, if an error occurs during the execution of the plug-in program 3, and if a retry is executed after the lapse of a predetermined time since the occurrence of the error, the plug-in program 3 reports the retry to the plug-in management program 4. Thereby, the plug-in program 3 is placed under the scheduling by the plug-in scheduling program 10. The plug-in scheduling program 10 further manages the execution priority and the execution time of the plug-in program 3.

The plug-in database 11 is a database for the plug-in program 3. The hardware control program 12 executes such processes as the detection of the size of the RAM 7 and the control of the HDD or network 15. The user interface program 14 receives an instruction by a user sent through an input operation. The nonvolatile memory 13 stores the user information and the value of the usage statistics of the plug-in program 3. The nonvolatile memory 13 further stores the name of the resident the plug-in program 3.

Figure 3:
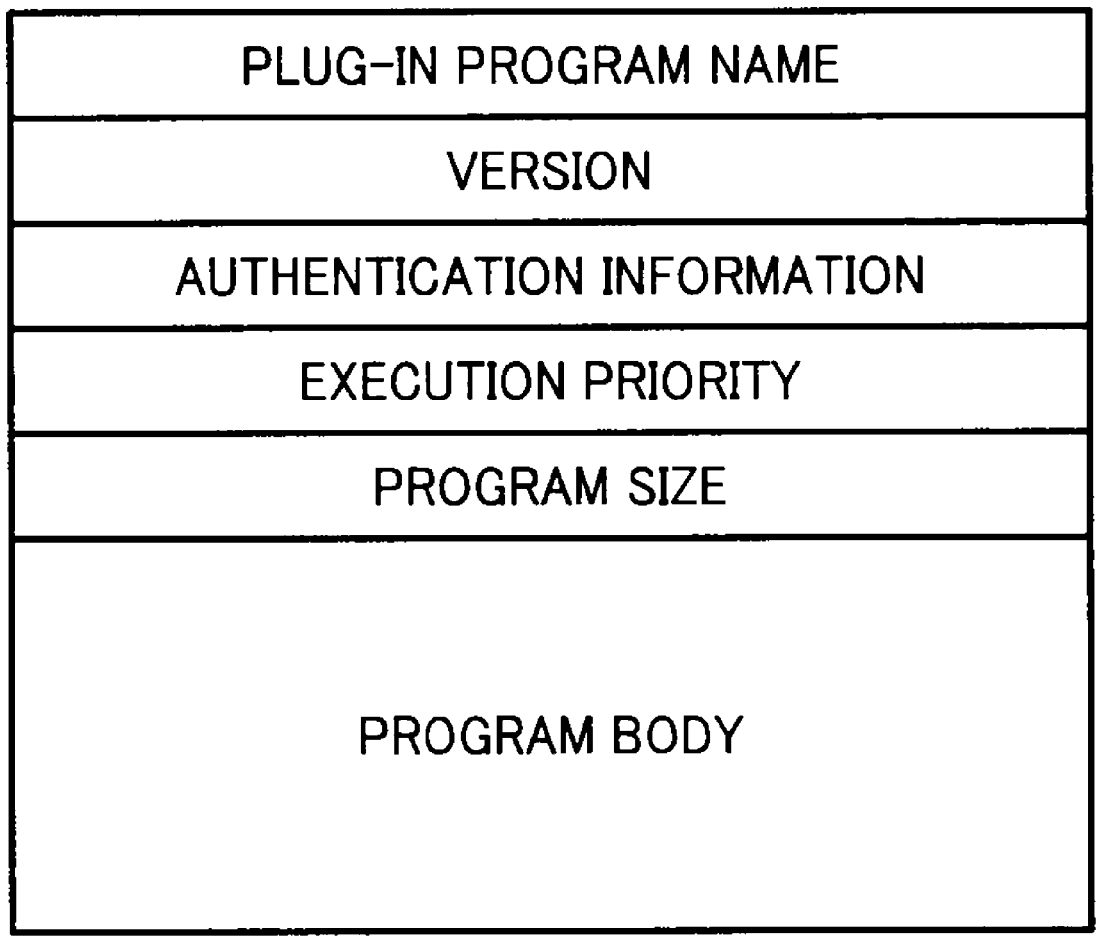
FIG. 3 is a diagram illustrating management information added to the body of a plug-in program.

FIG. 3 is a diagram illustrating management information added to the body of the plug-in program 3. In FIG. 3, the plug-in program name represents the identifier of the plug-in program 3. Further, the execution priority is represented by a number from one to ten, for example, with one representing the highest priority and ten representing the lowest priority.

Description will now be made of an embodiment of operations of the multifunctional machine configured as described above. The following description will be made of an example in which a user accessible to the multifunctional machine is allowed to log into the multifunctional machine, and in which the time-specified facsimile transmission function is selected. Further, the example is assumed to represent the most basic situation in which the multifunctional machine is used by a single user and there is no other concurrently operating function. Further, in the example, two plug-in programs 3 necessary for implementing the facsimile function, i.e., a plug-in program 3 for a scan control and a plug-in program 3 for a transmission control are assumed not to be resident in the multifunctional machine. It is also assumed in the example that the scan control is higher in the execution priority than the transmission control. This is because the transmission operation can be executed after the user walks away from the multifunctional machine.

Description will be made with reference to the sequence chart of FIG. 4. FIG. 4 illustrates the plug-in process of the plug-in program 3 for the scan control.

Upon receipt of an instruction for executing the facsimile function from the user via a predetermined user interface, the user interface program 14 requests the application program 2 to execute the facsimile function (Step S1). In this process, the transmission time specified by the user is transmitted to the application program 2 as the parameter information indicating the execution time of the facsimile transmission.

Upon receipt of the request for executing the facsimile function, the application program 2 detects a plug-in point, i.e., a portion of the application program 2 to which the function can be added (Step S2).

Then, the application program 2 requests the plug-in management program 4 to invoke the plug-in programs 3 (Step S3). In this process, the execution time of the facsimile function, i.e., the execution time of each of the plug-in program 3 is specified. The real time is specified for the plug-in program 3 for the scan control, while the above-described transmission time is specified for the plug-in program 3 for the transmission control.

Upon receipt of the request for invoking the plug-in programs 3, the plug-in management program 4 first checks the respective locations of the plug-in programs 3 (Step S4), and then notifies the system plug-in management program 9 of the respective plug-in program names of the plug-in programs 3 (Step S5).

Thereafter, the plug-in management program 4 requests the plug-in database 11 to download the plug-in program 3 for the scan control (Step S6).

Further, the plug-in management program 4 requests the plug-in scheduling program 10 to schedule the plug-in program 3 for the transmission control, i.e., to register the transmission time (Step S7). The sequence thereafter will be described later with reference to FIG. 5.

Upon receipt of the download request, the plug-in database 11 refers to the HDD or network 15, i.e., the HDD of the multifunctional machine or the server on the network, for example, and receives the result of the reference (Step S8). Thereafter, the plug-in database 11 sends the plug-in management program 4 the result of the download request, e.g., information notifying that the requested download of the plug-in program 3 is executable (Step S9).

Upon receipt of the result of the download request, the plug-in management program 4 starts downloading the plug-in program 3 for the scan control, and reads the plug-in database 11 storing the plug-in program 3. Upon completion of the download, the plug-in management program 4 notifies the plug-in database 11 of the completion of the download (Step S10).

Then, the plug-in management program 4 immediately loads into the RAM 7 the downloaded plug-in program 3 for the scan control to execute the scan control (Step S11).

Upon completion of the scan control, the plug-in management program 4 inquires of the system plug-in management program 9 whether or not to make the plug-in program 3 for the scan control resident in the RAM 7. Then, the plug-in management program 4 receives the result of determination made by the system plug-in management program 9, i.e., the response to the inquiry (Step S12).

Upon receipt of the response to the inquiry, the plug-in management program 4 plugs out the plug-in program 3 for the scan control from the RAM 7 or makes the plug-in program 3 for the scan control resident in the RAM 7 on the basis of the result of determination made by the system plug-in management program 9 (Step S13).

Description will now be made with reference to the sequence chart of FIG. 5. FIG. 5 illustrates the plug-in process of the plug-in program 3 for the transmission control.

Upon receipt of the scheduling request, i.e., the request for registering the transmission time at Step S7 in FIG. 4, the plug-in scheduling program 10 detects the transmission time (Step S21). Then, the plug-in scheduling program 10 requests the plug-in management program 4 to immediately execute the plug-in program 3 for the transmission control (Step S22).

Upon receipt of the request for immediately executing the plug-in program 3 for the transmission control, the plug-in management program 4 first checks the location of the plug-in program 3 (Step S23). Then, the plug-in management program 4 requests the plug-in database 11 to download the plug-in program 3 for the transmission control (Step S24).

Upon receipt of the download request, the plug-in database 11 refers to the HDD or network 15, i.e., the HDD of the multifunctional machine or the server on the network, for example, and receives the result of the reference (Step S25). Thereafter, the plug-in database 11 sends the plug-in management program 4 the result of the download request, e.g., information notifying that the requested download of the plug-in program 3 is executable (Step S26).

Upon receipt of the result of the download request, the plug-in management program 4 starts downloading the plug-in program 3 for the transmission control, and reads the plug-in database 11 storing the plug-in program 3. Upon completion of the download, the plug-in management program 4 notifies the plug-in database 11 of the completion of the download (Step S27).

Then, the plug-in management program 4 immediately loads into the RAM 7 the downloaded plug-in program 3 for the transmission control to execute the transmission control (Step S28).

Upon completion of the transmission control, if an error occurs in the facsimile transmission, the plug-in management program 4 inquires of the system plug-in management program 9 whether or not to make the plug-in program 3 for the transmission control resident in the RAM 7. Then, the plug-in management program 4 receives the result of determination made by the system plug-in management program 9, i.e., the response to the inquiry (Step S29).

Upon receipt of the response to the inquiry, the plug-in management program 4 plugs out the plug-in program 3 for the transmission control from the RAM 7 or makes the plug-in program 3 for the transmission control resident in the RAM 7 on the basis of the result of determination made by the system plug-in management program 9 (Step S30). When the plug-in program 3 is plugged out from the RAM 7, the plug-in management program 4 registers a retry time in the plug-in scheduling program 10 in preparation for a retry (not illustrated).

Description will now be made of normal operations of the plug-in management program 4 and the system plug-in management program 9, i.e., a characteristic feature of the present invention.

Figure 6B:
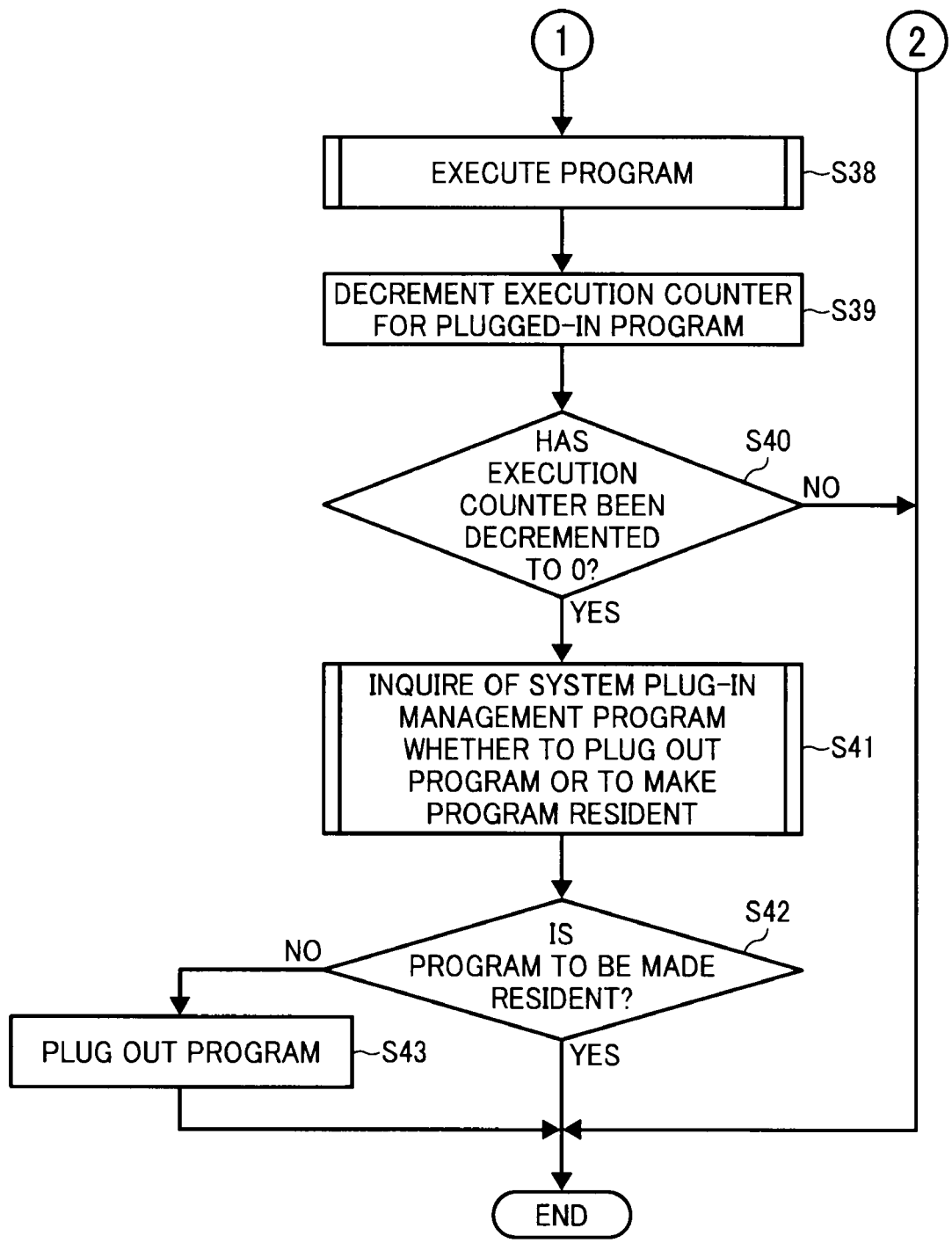

FIGS. 6A and 6B illustrate a control flow of a plug-in program load determination process by the plug-in management program 4. The following description will be made of, as an example, operations performed when a plurality of users simultaneously use the multifunctional machine to use the same function, i.e., the same application program 2.

The plug-in management program 4 notifies the system plug-in management program 9 of the plug-in program 3 and login user names (Step S31). Upon receipt of the notification, the system plug-in management program 9 registers the plug-in program 3 and the login user names in the plug-in usage statistics management program 6. The processes thereafter will be described later with reference to FIG. 7.

The plug-in management program 4 determines whether or not the requested plug-in program 3 is absent in the RAM 7 (Step S32). If the plug-in program 3 is already present in the RAM 7 (NO at Step S32), the procedure proceeds to Step S37.

If the plug-in program 3 is absent in the RAM 7 (YES at Step S32), the plug-in management program 4 determines whether or not the requested plug-in program 3 is scheduled to be immediately executed (Step S33). If the requested plug-in program 3 is not scheduled to be immediately executed (NO at Step S33), the plug-in management program 4 registers the schedule, i.e., the execution time of the plug-in program 3 in the plug-in scheduling program 10 (Step S35), and completes the sequence of processing.

If the requested plug-in program 3 is scheduled to be immediately executed (YES at Step S33), the plug-in management program 4 determines whether or not an area necessary for executing the plug-in program 3 can be secured in the RAM 7 (Step S34). If the area cannot be secured (NO at Step S34), the plug-in management program 4 registers the schedule, i.e., the execution time of the plug-in program 3 in the plug-in scheduling program 10 (Step S35), and completes the sequence of processing. If the area can be secured (YES at Step S34), the plug-in management program 4 executes the download of the requested plug-in program 3 (Step S36).

Then, the plug-in management program 4 increments an execution counter for the downloaded plug-in program 3 (Step S37). The execution counter is stored in the nonvolatile memory 13 together with the plug-in program name (the plug-in module name) in association with the plug-in program name. In the first plug-in of the plug-in program 3, the execution counter is incremented from zero to one. If another user attempts the simultaneous use of the same function, i.e., the plug-in of the same program as the already plugged-in program, the execution counter is incremented from one to two, and the already plugged-in program is shared and executed without execution of the plug-in operation of the latter program.

Then, the plug-in management program 4 executes the downloaded plug-in program 3 (Step S38).

Upon completion of the execution of the plug-in program 3, the plug-in management program 4 decrements the execution counter (Step S39).

The plug-in management program 4 then determines whether or not the execution counter has been decremented to zero (Step S40). If the execution counter has not been decremented to zero (NO at Step S40), the plug-in management program 4 completes the sequence of processing.

If the execution counter has been decremented to zero (YES at Step S40), the plug-in management program 4 inquires of the system plug-in management program 9 whether to make the plug-in program 3 resident or to plug out the plug-in program 3 (Step S41).

Then, the plug-in management program 4 receives the result of determination made by the system plug-in management program 9, and determines whether or not the result of determination is a response notifying that the plug-in program 3 is to be made resident (Step S42). If the result of determination is the response notifying that the plug-in program 3 is to be made resident (YES at Step S42), the plug-in management program 4 completes the sequence of processing.

If the result of determination is not the response notifying that the plug-in program 3 is to be made resident (NO at Step S42), the plug-in management program 4 executes the plug-out process of the plug-in program 3 (Step S43), and completes the sequence of processing. As described above, the plug-out process is executed only when the execution counter has been decremented to zero.

Figure 7:
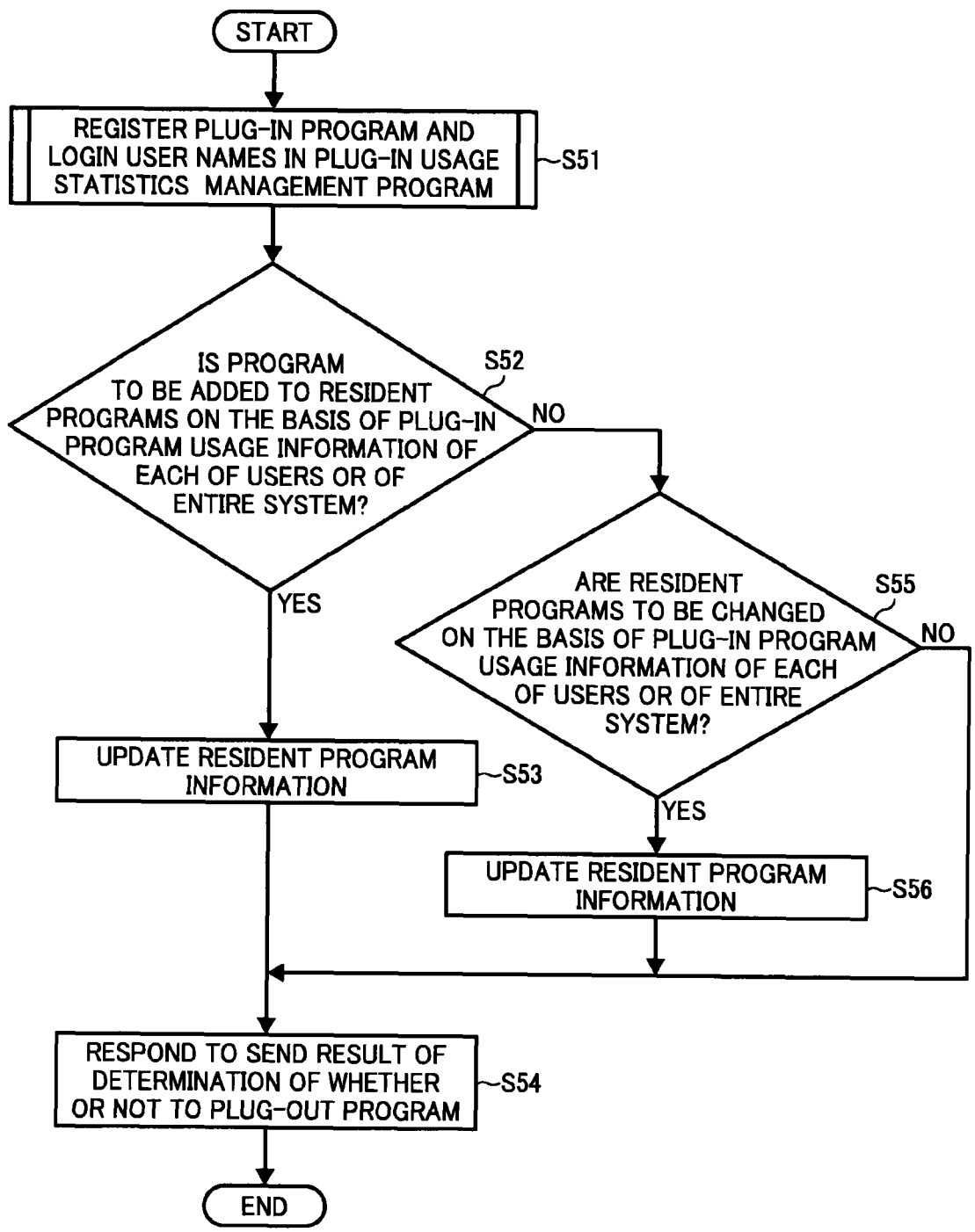
FIG. 7 is a flowchart illustrating a control flow of a resident program determination process by a system plug-in management program.

FIG. 7 is a control flow of a resident program determination process by the system plug-in management program 9.

As described in Step S31 of FIG. 6A, the system plug-in management program 9 receives from the plug-in management program 4 the plug-in program 3 and the login user names, and registers the plug-in program 3 and the login user names in the plug-in usage statistics management program 6 (Step S51). As described above, the plug-in usage statistics management program 6 collects the usage statistics for each of the users by associating the plug-in program name of the plug-in program 3, the download of which has been requested by the plug-in management program 4, with the number of invocations of the plug-in program 3. The information of the usage statistics is used to determine the plug-in program 3 to be made resident in the RAM 7.

Then, the system plug-in management program 9 determines whether or not to add the notified plug-in program 3 to the RAM 7 as a resident program (Step S52). The determination is made on the basis of the usage statistics information of the plug-in usage statistics management program 6, i.e., the number of uses of the notified plug-in program 3 by each of the users or the number of uses of the notified plug-in program 3 by all of the users, which corresponds to the number of uses of the notified plug-in program 3 in the entire system.

If the notified plug-in program 3 is determined to be added to the RAM 7 (YES at Step S52), the system plug-in management program 9 updates the resident program information, i.e., the program names stored in the nonvolatile memory 13 (Step S53), and sends the plug-in management program 4 the response notifying the result of the determination of whether or not to plug out the plug-in program 3 (Step S54). Then, the system plug-in management program 9 completes the sequence of processing.

If the notified plug-in program 3 is determined not to be added to the RAM 7 (NO at Step S52), the system plug-in management program 9 determines whether or not to change the resident programs on the basis of the usage statistics information of the plug-in usage statistics management program 6, i.e., the usage statistics information of each of the users or the usage statistics information of the entire system (Step S55). If the resident programs are determined not to be changed (NO at Step S55), the system plug-in management program 9 sends the plug-in management program 4 the response notifying the result of the determination of whether or not to plug out the plug-in program 3 (Step S54). Then, the system plug-in management program 9 completes the sequence of processing.

If the resident programs are determined to be changed (YES at Step S55), the system plug-in management program 9 updates the resident program information, i.e., the program names stored in the nonvolatile memory 13 (Step S56), and sends the plug-in management program 4 the response notifying the result of the determination of whether or not to plug out the plug-in program 3 (Step S54). Then, the system plug-in management program 9 completes the sequence of processing.

As described above, the system plug-in management program 9 is linked to the plug-in usage statistics management program 6 to obtain the understanding of the state of use of the plug-in program 3 by each of the users or the state of use of the plug-in program 3 in the entire system and determine the plug-in program 3 to be made resident. For example, in the case of the state of use of the plug-in program 3 by each of users, if there are five users who frequently log in the multifunctional machine, ten plug-in programs (plug-in modules) frequently used by the five users can be made resident by the system plug-in management program 9. To enable the above-described operation, the management of the user information and the usage statistics by the plug-in usage statistics management program 6 is necessary.

In FIG. 7, the determination of whether or not to make the plug-in program 3 resident is made with the use of the usage statistics information of the plug-in usage statistics management program 6. The determination may be made also in consideration of the number of uses (the usage frequency) of the multifunctional machine by each of users, which is counted by the user information program 5. That is, the determination may be made on the basis of the number of uses of the multifunctional machine by each of users and the number of uses of the plug-in program 3 by each of users. With this configuration, the plug-in program 3 used by the frequent users of the multifunctional machine can be made resident.

Further, the system plug-in management program 9 may store, in a predetermined storage device such as the nonvolatile memory 13, for example, the state of the RAM 7 before the power-off of the multifunctional machine, i.e., the resident state of the plug-in program 3. Then, at the next power-on of the multifunctional machine, the system plug-in management program 9 may read the resident program information (the resident plug-in program names) stored in the nonvolatile memory 13 to restore the resident state of the plug-in program 3 in the RAM 7.

As described above, according to the embodiments of the present invention, the plug-in and the plug-out of a necessary program can be automatically executed with the use of a plug-in platform. Therefore, the size of the programs resident in a RAM can be reduced. Accordingly, it is possible to reduce the size of the RAM installed in a multifunctional machine, and thus to reduce the costs. Further, a program in execution can use a sufficient space of the RAM. Therefore, improvement can be expected in the printing performance and the data distribution and transmission performance. As a result, the cost performance can be improved.

If a program is loaded into the RAM every time the program is necessary, the operability is not improved. According to the embodiments of the present invention, however, frequently used programs for implementing the functions of the multifunctional machine can be made resident in the RAM. Therefore, it is possible to save the time for loading the programs into the memory from an HDD or a network, i.e., the time for activating the programs. Accordingly, improvement can be expected in the printing performance and the data distribution and transmission performance. As a result, the operability for users can be improved.

The multifunctional machine may be used by a plurality of users. In this case, frequent users of the multifunctional machine may feel stress. According to the embodiments of the present invention, however, programs used by the frequent users of the multifunctional machine can be made resident. Therefore, it is possible to improve the printing performance and the data distribution and transmission performance, and thus to improve the operability for the users without causing stress on the frequent users.

In the multifunctional machine, the same function may happen to be simultaneously used by a plurality of users. According to the embodiments of the present invention, an additional program can be shared in such a case. Therefore, the RAM capacity can be reduced. As a result, it is possible to improve the printing performance and the data distribution and transmission performance, and thus to improve the operability for the users.

Some types of programs do not need to be immediately executed. According to the embodiments of the present invention, an additional program is loaded into the RAM when necessary. Therefore, unnecessary use of the RAM can be prevented. As a result, it is possible to improve the printing performance and the data distribution and transmission performance, and thus to improve the operability for the users.

A RAM is limited. Therefore, if additional programs made resident in the RAM are increased, an additional program may not be loaded into the RAM. The embodiments of the present invention, however, can reliably provide users with a requested function even in the above case. Accordingly, the operability for the users can be improved.

The operability needs to be maintained when the multifunctional machine is restarted after the power-off thereof. According to the embodiments of the present invention, the state before the power-off can be restored even after the power-off. Therefore, the operability expected by the users can be always provided even after the power-off. Accordingly, the operability for the users can be improved.

The description has been made of the embodiments of the present invention. The present invention, however, is not limited to the embodiments described above, and thus can be modified in a variety of ways within the scope not departing from the gist of the present invention.

For example, the control operations of the above-described embodiments can be executed by hardware, software, or the combined configuration of hardware and software.

It is possible to execute the processing by software by installing a program recorded with the processing sequence in a memory of a computer installed in special hardware and then executing the installed program, or by installing the program in a general-purpose computer capable of executing a variety of processes and then executing the installed program.

The program can be previously recorded in a hard disk or a ROM serving as a recording medium, for example.

Alternatively, the program can be temporarily or permanently stored (recorded) in a removable recording medium, such as a floppy (a registered trademark) disc, a CD-ROM (Compact Disc Read-Only Memory), an MO (Magneto Optical) disc, a DVD (Digital Versatile Disc), a magnetic disc, and a semiconductor memory. Such a removable recording medium can be provided as so-called packaged software.

The program can be installed into a computer from the removable recording medium as described above. The program can also be wirelessly transmitted to the computer from a download site, or can be transmitted to the computer through wires via a network, such as the Internet and a LAN (Local Area Network). Meanwhile, the computer can receive the thus transmitted program and install the program in a recording medium built therein, such as a hard disk.

Further, the execution of the processing is not limited to the chronological execution in accordance with the processing operations described in the above-described embodiments. Thus, the processing can be configured such that the processes are executed concurrently or individually as needed or in accordance with the processing capability of the device which executes the processes.

The present invention is applicable to apparatuses, equipment, systems, methods, and programs enabling, during the execution of a predetermined program, the plug-in and the execution of another program.

The above-described embodiments are illustrative and do not limit the present invention. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape, are not limited the embodiments and thus may be preferably set. It is therefore to be understood that within the scope of the appended claims, the disclosure of this patent specification may be practiced otherwise than as specifically described herein.

The invention claimed is:

1. An information processing terminal enabling, during execution of a predetermined application program, addition of an additional program and execution of the additional program, the information processing terminal comprising:
   a management device configured to manage the additional program and a plug-in point included in the application program by associating the additional program with the plug-in point;
   an execution device configured to execute the application program, wherein, during execution, the application program detects the plug-in point, which is a portion of the application program to which the additional program can be added, and sends a request to acquire the additional program to an acquisition device, when the plug-in point is detected;
   the acquisition device configured to acquire, in response to receiving the request, the additional program associated with the plug-in point from a predetermined storage device and to store the additional program in a memory, wherein the execution device is configured to execute the acquired additional program stored in the memory; and
   a deletion device configured to delete, upon completion of the execution of the additional program, the additional program from the memory,
   wherein the management device is further configured to manage repeated execution of the additional program stored in the memory, without repeatedly acquiring the additional program from the predetermined storage device, when multiple users of the information processing terminal request execution of the application program, including the additional program, at a same time.

2. The information processing terminal as described in claim 1, further comprising:
   a first counting device configured to count a number of uses of the additional program; and
   a determination device configured to determine, based on the counted number of uses of the additional program, whether or not to make the additional program resident in the memory.

3. The information processing terminal as described in claim 2,
   wherein the first counting device is configured to count one of the number of uses of the additional program by each user and the number of uses of the additional program by all users.

4. The information processing terminal as described in claim 3, further comprising:
   a second counting device configured to count the number of uses of the information processing terminal by each user,
   wherein the determination device is configured to determine, based on the number of uses of the additional program by each user and the number of uses of the information processing terminal by each user, whether or not to make the additional program resident in the memory.

5. The information processing terminal as described in claim 1, further comprising:
   a deferring device configured to defer the acquisition of the additional program depending on a condition for starting the execution of the additional program.

6. The information processing terminal as described in claim 5,
   wherein the condition for starting the execution of the additional program includes at least one of a time for starting the execution of the additional program and an area of the memory in which the additional program can be executed.

7. The information processing terminal as described in claim 1, further comprising:
   a storing device storing a state of the memory before a power-off of the information processing terminal; and
   a restoring device configured to restore the stored state of the memory upon a next power-on of the information processing terminal.

8. An information processing method enabling, during the execution of a predetermined application program on an information processing terminal, addition of an additional program and execution of the additional program, the information processing method comprising:
- managing the additional program and a plug-in point included in the application program by associating the additional program with the plug-in point;
- detecting, during execution of the application program, the plug-in point, which is a portion of the application program to which the additional program can be added;
- sending, by the application program, a request to acquire the additional program, when the plug-in point is detected;
- acquiring, in response to the request, the additional program associated with the plug-in point from a predetermined storage device and storing the additional program in a memory;
- executing the acquired additional program stored in the memory; and
- deleting, upon completion of the execution of the additional program, the additional program from the memory,
- wherein the managing step further includes managing repeated execution of the additional program stored in the memory, without repeatedly acquiring the additional program from the predetermined storage device, when multiple users of the information processing terminal request execution of the application program, including the additional program, at a same time.

9. A non-transitory computer-readable medium storing a program enabling, during the execution of a predetermined application program on an information processing terminal, addition of an additional program and execution of the additional program, the program, when executed, causing a computer to execute the steps of:
- managing the additional program and a plug-in point included in the application program by associating the additional program with the plug-in point;
- detecting, during execution of the application program, the plug-in point, which is a portion of the application program to which the additional program can be added;
- sending, by the application program, a request to acquire the additional program, when the plug-in point is detected;
- acquiring, in response to the request, the additional program associated with the plug-in point from a predetermined storage device and storing the additional program in a memory;
- executing the acquired additional program stored in the memory; and
- deleting, upon completion of the execution of the additional program, the additional program from the memory,
- wherein the managing step further includes managing repeated execution of the additional program stored in the memory, without repeatedly acquiring the additional program from the predetermined storage device, when multiple users of the information processing terminal request execution of the application program, including the additional program, at a same time.

10. The computer-readable medium as described in claim 9, wherein the program further causes the computer to execute:
- counting a number of uses of the additional program; and
- determining, based on the counted number of uses of the additional program, whether or not to make the additional program resident in the memory.

11. The computer-readable medium as described in claim 10,
- wherein the counting step includes counting one of the number of uses of the additional program by each user and the number of uses of the additional program by all users.

12. The computer-readable medium as described in claim 11, wherein the program further causes the computer to execute:
- counting the number of uses of the computer by each user,
- wherein the determining step includes determining, based on the number of uses of the additional program by each user and the number of uses of the computer by each user, whether or not to make the additional program resident in the memory.

13. The computer-readable medium as described in claim 9, wherein the program further causes the computer to execute:
- deferring the acquisition of the additional program depending on a condition for starting the execution of the additional program.

14. The computer-readable medium as described in claim 13,
- wherein the condition for starting the execution of the additional program includes at least one of a time for starting the execution of the additional program and an area of the memory in which the additional program can be executed.

15. The computer-readable medium as described in claim 9, wherein the program further causes the computer to execute:
- storing a state of the memory before a power-off of the computer; and
- restoring the stored state of the memory upon a next power-on of the computer.

* * * * *